United States Patent [19]

Ulrich

[11] Patent Number: 5,569,340

[45] Date of Patent: Oct. 29, 1996

[54] TRACTION DEVICE

[76] Inventor: Fritzler Ulrich, 65-15 Booth St., Rego Park, N.Y. 11374-4155

[21] Appl. No.: 380,289

[22] Filed: Jan. 30, 1995

[51] Int. Cl.⁶ ................................................. B60C 27/04
[52] U.S. Cl. ...................... 152/225 C; 152/216; 152/217
[58] Field of Search .............................. 152/225 C, 216, 152/213 R, 179, 185.1, 187, 217

[56] References Cited

U.S. PATENT DOCUMENTS

| | | | |
|---|---|---|---|
| 998,369 | 7/1911 | McKenzie | 152/228 |
| 1,169,525 | 1/1916 | Bixby et al. | 152/226 |
| 2,343,131 | 2/1944 | Austin | 152/225 C |
| 2,449,033 | 9/1948 | Younglove | 152/226 |
| 2,474,262 | 6/1949 | Linderme | 152/225 C X |
| 2,775,993 | 1/1957 | Young | 152/225 C X |
| 3,103,242 | 9/1963 | Culp | 152/225 C X |
| 3,157,217 | 11/1964 | Ledbetter | 152/225 C |
| 3,245,451 | 4/1966 | Gellman | 152/225 C |
| 3,291,180 | 12/1966 | Gellman | 152/225 C |
| 4,159,731 | 7/1979 | Dyrdahl | 152/224 |

*Primary Examiner*—Michael W. Ball
*Assistant Examiner*—Francis J. Lorin
*Attorney, Agent, or Firm*—Michael I. Kroll

[57] ABSTRACT

A traction device for a tire for a driven wheel of a vehicle includes a base for resting circumferentially upon the tread of a tire. The device includes an adjustable clamp assembly extending across the base longitudinally and includes a front and a rear jaw which, when mounted, hold onto the sidewalls of the tire. The front jaw is adjustable in any and all of three different settings: coarse, normal and fine.

21 Claims, 3 Drawing Sheets

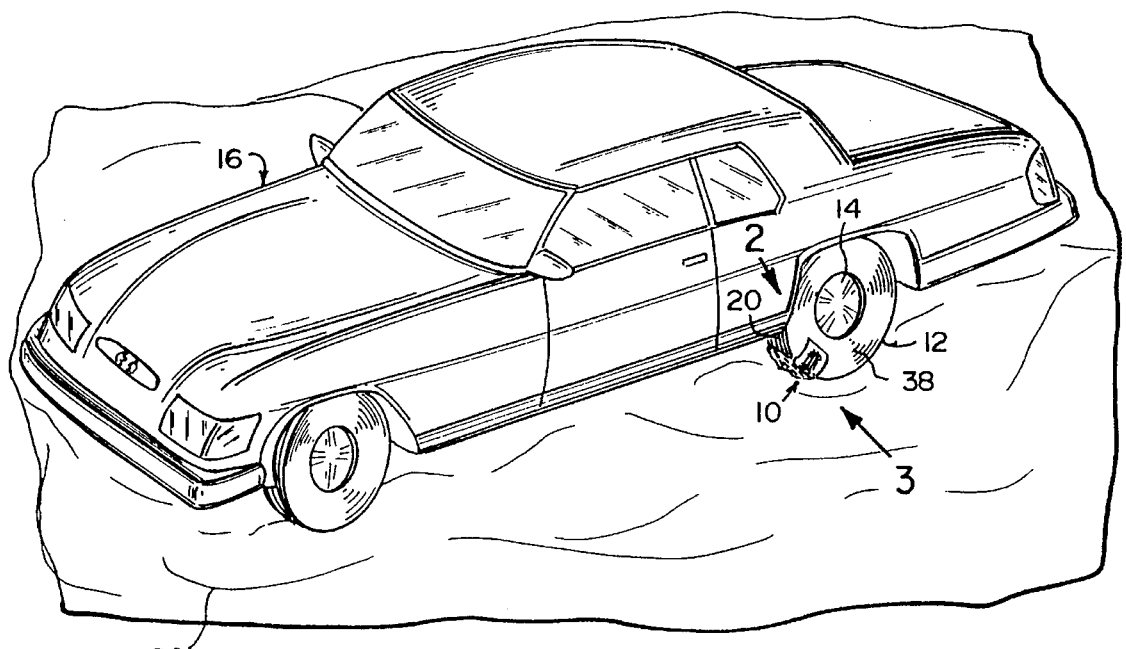
Fig. 1
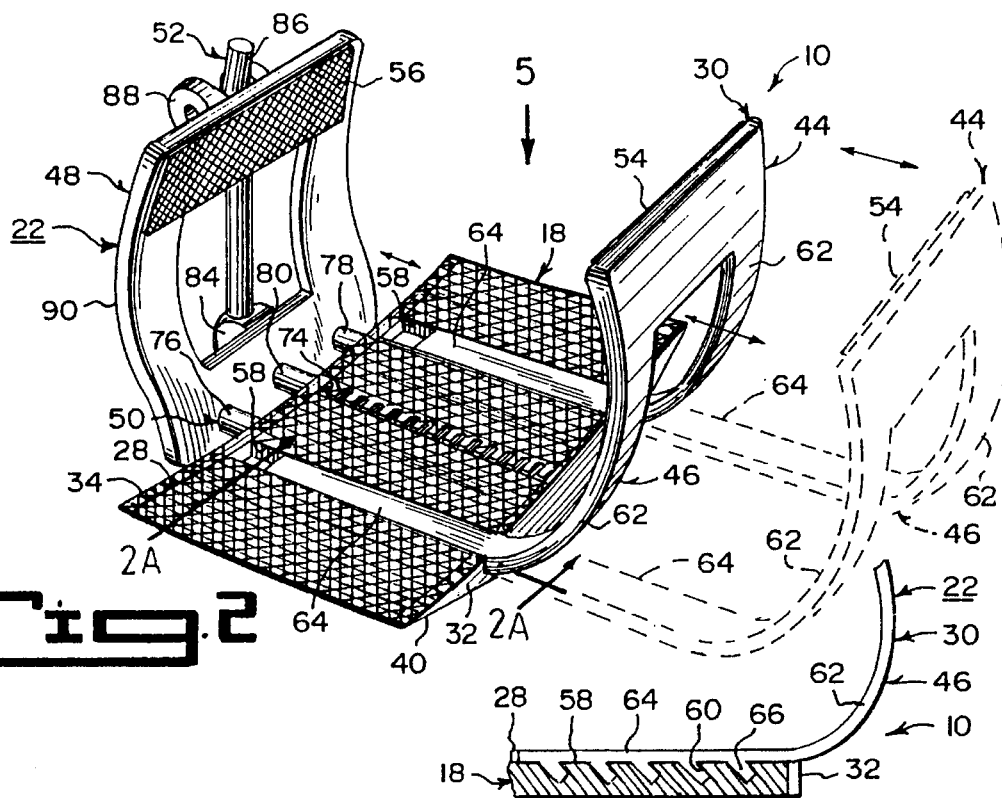
Fig. 2
Fig. 2A

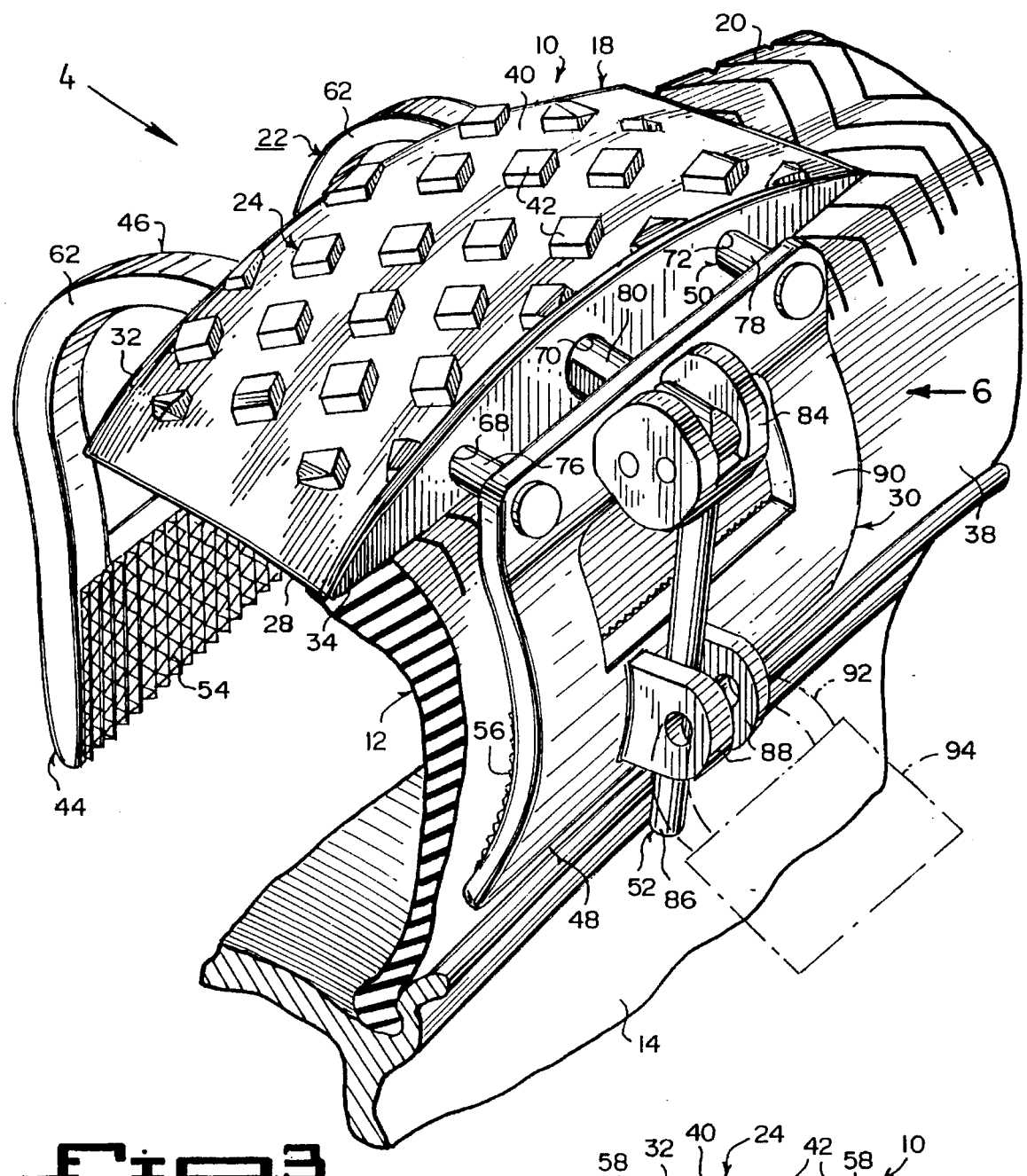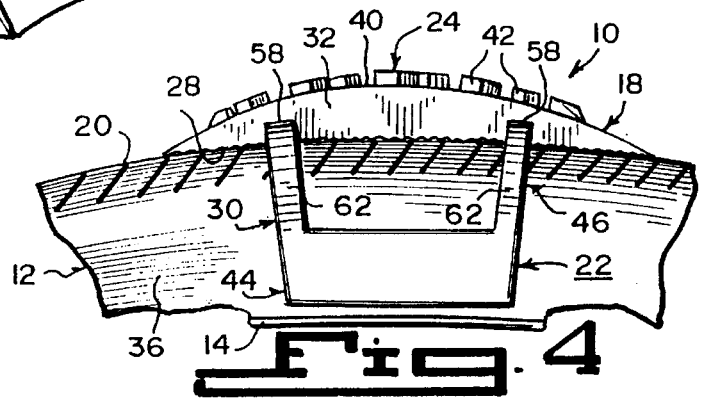

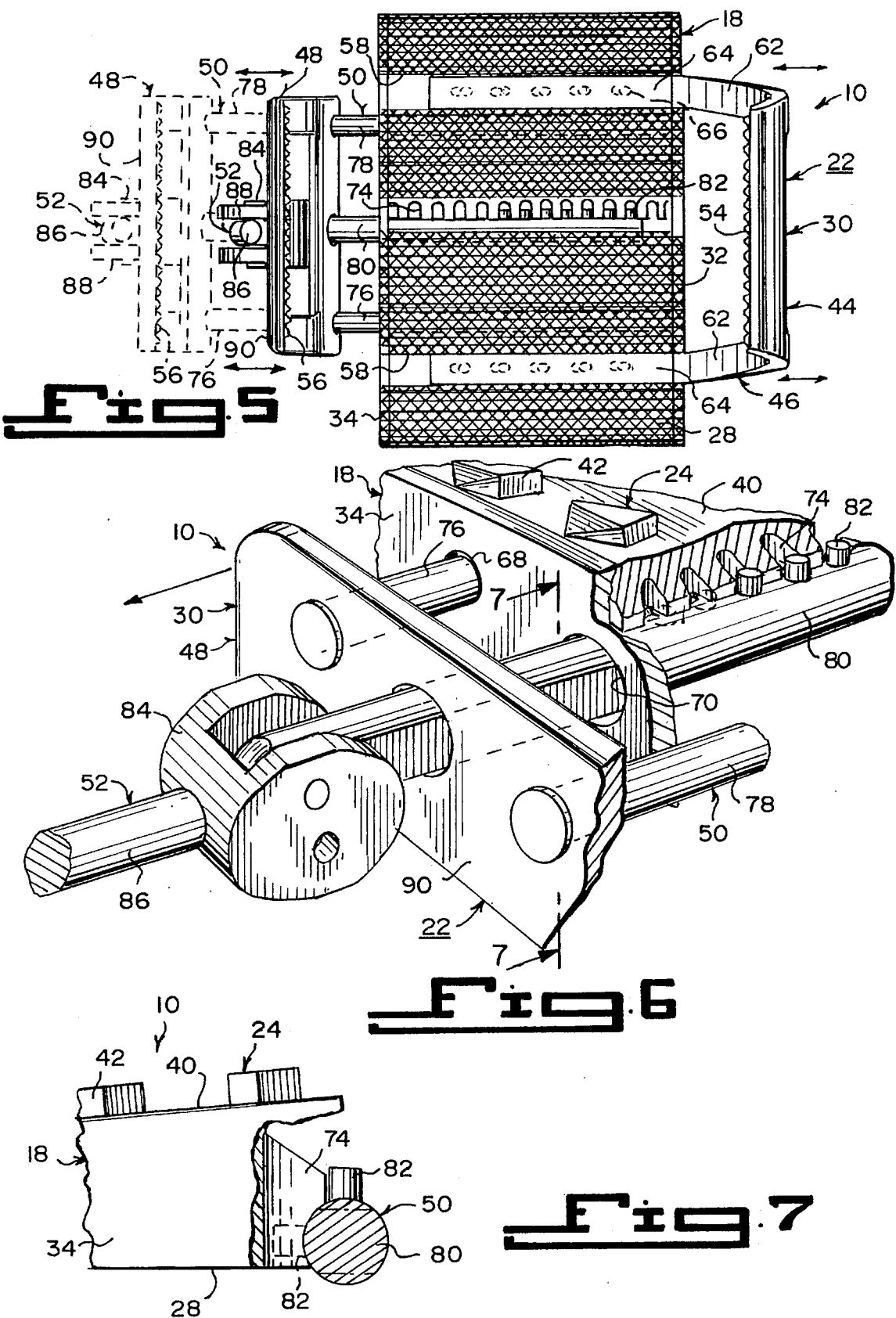

5,569,340

1

TRACTION DEVICE

BACKGROUND OF THE INVENTION

1. Field of the Invention

The instant invention relates generally to tire cleats and more specifically it relates to an improved traction device for a tire on a driven wheel of a motor vehicle.

2. Description of the Prior Art

Numerous cleats have been provided in prior art. For example McKenzie U.S. Pat. No. 998,369 ; Bixby et al U.S. Pat. No. 1,169,525, to Younglove U.S. Pat. No. 2,449,033 and Dyrdahl U.S. Pat. No. 4,159,731 all are illustrative of such prior art. While these units may be suitable for the particular purpose to which they address, they would not be as suitable for the purposes of the present invention as heretofore described.

The patent to McKenzie, U.S. Pat. No. 998,369 teaches an anti-skid device including an arcuate plate adapted to embrace a tire transversely and having a tread face concave from edge to edge of the plate forming a chain seat. Lugs are arranged adjacent to the longitudinal edges of the chain seat. A means is for securing the plate to a wheel tire. A link chain lying in the valley of the concave chain seat has terminal hooks removably and pivotally engaging the securing means. The chain being swingable bodily to a slight degree in the concave seat, whereby the chain constantly clears itself of accumulations. The movement of the chain being limited by contact with the outwardly curving longitudinal sides of the seat valley. Contact with and consequential mutual erosion of the lugs and chain when under load is positively prevented.

The Bixby et al. U.S. Pat. No. 1,169,525 teaches an anti-skidding device of the class described, the combination of a plurality of plates. Each of the plates comprising a body having flat inner surfaces being adapted to rest upon the outer periphery of a tire. A body portion is formed integral upon the plate adjacent each corner thereof. A central base is formed upon the plate. Transversely extending ribs are formed upon the bodies and base. The ribs extend for a considerable distance beyond the outer surfaces of the plate. The ribs being adapted to hold the plate against slipping. A means is for holding the plate in engagement with the outer portion of a tire.

The Younglove U.S. Pat. No. 2,449,033 teaches a traction device for use on a tire and attachment to the out-turned side flanges of a tire-retaining rim comprising a hook-shaped member adapted to straddle the tire and provided on one end with gripping lugs adapted to seat against one of the flanges. The member having at its other end a reduced tongue adapted to extend alongside the other of the flanges. An end thumb screw in the tongue is adapted to be turned against the other flange. The screw coacts with the lugs to clamp the member to the outer sides of the flanges.

The Dyrdahl, U.S. Pat. No. 4,159,731 teaches a traction device for vehicle wheels is provided comprising spaced traction plates having traction bars extending from both major surfaces thereof. The plates being interconnected by U-shaped tire side wall gripping elements. The device being expandable to span tires of different widths. A spring biased shoe carried by the bight portion of one of the U-shaped gripping elements is adapted to more tightly grip the tires as forces tending to pull the device from the tire are applied. The shoe is easily manually released to remove the device from a tire.

2

SUMMARY OF THE INVENTION

A primary object of the present invention is to provide an improved traction device that will overcome the shortcomings of the prior art devices.

Another object is to provide an improved traction device for a tire on a driven wheel of a motor vehicle, having a studded base to produce traction when stuck on ice, snow or any other slippery road surface.

An additional object is to provide an improved traction device that contains a clamping structure for the studded base that can quickly attach to and detach from the side walls of the tire and be adjustable thereto in order to fit different sized tires.

Still an additional object is to provide an improved traction device which applies pressure against both sides of the tire in order to secure the device to the tire, the amount of pressure being predetermined so as to prevent the side wall of the tire from becoming dislodged from the driven wheel.

A further object is to provide an improved traction device that is simple and easy to use.

A still further object is to provide an improved traction device that is economical in cost to manufacture.

Further objects of the invention will appear as the description proceeds.

To the accomplishment of the above and related objects, this invention may be embodied in the form illustrated in the accompanying drawings, attention being called to the fact, however, that the drawings are illustrative only, and that changes may be made in the specific construction illustrated and described within the scope of the appended claims.

BRIEF DESCRIPTION OF THE DRAWING FIGURES

Various other objects, features and attendant advantages of the present invention will become more fully appreciated as the same becomes better understood when considered in conjunction with the accompanying drawings, in which like reference characters designate the same or similar parts throughout the several views, and wherein:

FIG. 1 is 1a front perspective view of a motor vehicle in snow or ice, showing the instant invention installed on a tire of a drive wheel.

FIG. 2 is a rear perspective view of the instant invention per se taken in the direction of arrow 2 in FIG. 1.

FIG. 2A is a cross sectional view taken along line 2A—2A in FIG. 2.

FIG. 3 is a front perspective view taken in the direction of arrow 3 in figure, with the tire and wheel broken away.

FIG. 4 is a rear elevational view taken in the direction of arrow 4 in FIG. 3.

FIG. 5 is a top view taken in the direction of arrow 5 in FIG. 2.

FIG. 6 is a front perspective view of a portion thereof with parts broken away taken in the direction of arrow 6 in FIG. 3, with the lever lifted up.

FIG. 7 is a cross sectional view taken along line 7—7 in FIG. 6 with parts broken away.

Similar reference characters denote corresponding features consistently throughout the attached drawings.

DETAILED DESCRIPTION OF THE PREFERRED EMBODIMENTS

Turning now descriptively to the drawings, in which similar reference characters denote similar elements throughout the several views, FIGS. 1 through 7 illustrate an improved traction device 10 for a tire 12 on a driven wheel 14 of a motor vehicle 16 comprising a base 18 adapted to rest longitudinally upon the tread 20 of the tire 12. A facility 22 is for securing the base 18 to the tire 12. A structure 24 on the base 18 is for providing traction when the tire 12 is stuck on ice/snow 26 and any other slippery road surface.

The base 18 includes a slightly curved inner concave surface 28, to best fit up against the tread 20 of the tire 12. The slightly curved inner concave surface 28 of the base 18 is serrated to better grip and prevent slippage of the base 18 on the tread 20 of the tire 12, especially at the moment of rotation when the tread 20 of the tire 12 presses down onto the base 18.

The securing facility 22 is an adjustable clamp assembly 30 extending from longitudinal sides 32, 34 of the base 18, so as to hold onto the side walls 36, 38 of the tire 12 so as to apply pressure against both sides of the tire 36, 38 to secure the improved traction device 10 to the tire 12. The base 18 includes a greater curved convex outer surface 40, to best conform to the tread 20 of the tire 12. The traction structure 24 consists of a plurality of studs 42 extending away from the greater curved convex outer surface 40 of the base 18.

The adjustable clamp assembly 30 contains a rear jaw 44. A facility 46 on the first longitudinal side 32 of the base 18 is for adjusting in a retained course manner the rear jaw 44. A front jaw 48 is also provided. A facility 50 on the second longitudinal side 34 of the base 18, is for adjusting in a retained normal manner the front jaw 48. A facility 52 on the second longitudinal side 34 of the base 18 is for adjusting in a retained fine manner the front jaw 48, so that the rear jaw 44 and the front jaw 48 will butt up against the opposite side walls 36, 38 of the tire 12.

The rear jaw 44 includes an inner concave surface 54 to conform to the rear side wall 36 of the tire 12. The front jaw 48 includes an inner concave surface 56, to conform to the front side wall 38 of the tire 12. The inner concave surface 54 of the rear Jaw 44 is serrated, to better grip and prevent slippage on the rear side wall 36 of the tire 12. The inner concave surface 56 of the front jaw 48 is serrated to better grip and prevent slippage on the front side wall 36 of the tire 12.

The coarse adjusting facility 46 consists of the slightly curved inner concave surface 28 of the base 18 having a pair of spaced apart transverse grooves 58 extending from the first longitudinal side 32. Each groove 58 has a plurality of forwardly angled holes 60 therealong. The rear jaw 44 has a pair of spaced apart curved arms 62. Each arm 62 has a straight portion 64 sized to fit into one groove 58. Each straight portion 64 has a plurality of forwardly angled fingers 66 therealong, to adjustably snap fit into the forwardly angled holes 60 in the matching groove 58.

The normal adjusting facility 50 includes the base 18 having three spaced apart transverse apertures 68, 70, 72 extending from the second longitudinal side 34. The second middle aperture 70 has a plurality of spaced apart transverse side slots 74. A pair of guide pins 76, 78 extend from the front jaw 48 into the first and third transverse apertures 68, 72 in the base 18 in an adjustable manner. A shaft 80 extends through the front jaw 48 and into the second middle aperture 70 in an adjustable manner. A plurality of spaced apart stub posts 82 are on the shaft 80. When the shaft is rotated ninety degrees, the stub posts 82 will enter and engage with the transverse side slots 74, to lock the shaft 80 into position.

The fine adjusting facility 52 contains a pivot cam 84 rotatively connected off center to an outer distal end of the shaft 80. A lever 86 is connected to the pivot cam 84. When the lever 86 is rotated against the front jaw 48, the pivot cam 84 will gently press against the front jaw 48, to allow the front jaw 48 to apply a pre-determined amount of pressure against the front side wall 38 of the tire 12, to retain the base 18 in place and to prevent the side wall of the tire 12 from being dislodged from the driven wheel 14.

The front jaw 48 includes a pair of spaced apart lugs 88 extending from an outer surface 90 between the lever 86, when the lever is rotated against the front jaw 48. A shackle 92 of a padlock can engage with the lugs 88 to lock the lever 86 in place against the front jaw 48.

LIST OF REFERENCE NUMBERS

10—improved traction device
12—tire
14—driven wheel
16—motor vehicle
18—base of 10
20—tread of 12
22—securing facility of 10
24—traction structure on 18
26—ice/snow
28—slightly curved inner concave surface of 18
30—adjustable clamp assembly
32—first longitudinal side of 18
34—second longitudinal side of 18
36—rear side wall of 12
38—front side wall of 12
40—greater curved convex outer surface of 18
42—stud of 24
44—rear jaw
46—coarse adjusting facility on 32
48—front jaw
50—normal adjusting facility on 34
52—fine adjusting facility on 34
54—inner concave surface of 44
56—inner concave surface of 48
58—transverse groove in 28
60—forwardly angled hole in 58
62—curved arm
64—straight portion of 62
66—forwardly angled finger on 64
68—first transverse aperture in 18
70—second transverse aperture in 18
72—third transverse aperture in 18
74—transverse side slot in 70
76—guide pin into 68
78—guide pin into 72
80—shaft into 70
82—stub post
84—pivot cam on 80
86—lever
88—lug on 90
90—outer surface of 48
92—shackle of 94
94—padlock It will be understood that each of the elements described above, or two or more together may also find a useful application in other types of methods differing from the type described above.

While certain novel features of this invention have been shown and described and are pointed out in the annexed claims, it is not intended to be limited to the details above, since it will be understood that various omissions, modifications, substitutions and changes in the forms and details of the device illustrated and in its operation can be made by those skilled in the art without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed is new and desired to be protected by Letters Patent is set forth in the appended claims:

1. A traction device for a tire on a driven wheel of a motor vehicle, comprising:
   a) a base adapted for resting circumferentially upon a tread of a tire;
   b) means for securing said base to said tire, said means for securing including an adjustable clamp assembly extending from first and second longitudinal sides of said base for holding onto side walls of said tire for applying pressure against both sides of said tire for securing said traction device to said tire, said adjustable clamp assembly including a rear jaw, a front jaw, means on said first longitudinal side of said base for adjusting in a retained coarse manner said rear jaw, means on said second longitudinal side of said base for adjusting in a retained normal manner said front jaw, and means on said second longitudinal side of said base for adjusting in a retained fine manner said front jaw so that said rear jaw and said front jaw will butt up against opposite side walls of said tire; and,
   c) means for providing traction for said tire when said tire is stuck on ice, snow or other slippery road surface, said means for providing traction located on said base.

2. The traction device according to claim 1, wherein said base includes a slightly curved inner concave surface to best fit up against a tread of the tire.

3. The traction device according to claim 2, wherein said slightly curved inner concave surface of said base is serrated for better gripping and for preventing slippage of said base on the tread of said tire.

4. The traction device according to claim 1, wherein said base includes a curved convex outer surface to best conform to the tread of the tire.

5. The traction device according to claim 1, further comprising a plurality of studs extending away from said greater curved convex outer surface of said base.

6. The traction device according to claim 1, wherein said rear jaw comprises an inner concave surface for conforming to a rear side wall of said tire.

7. The traction device according to claim 6, wherein said inner concave surface of said rear jaw is serrated for better gripping and preventing slippage on the rear side wall of the tire.

8. The traction device according to claim 1, wherein said front jaw comprises an inner concave surface for conforming to a front side wall of said tire.

9. The traction device according to claim 1, wherein said means for adjusting in a retained coarse manner includes:
   a) said slightly curved inner concave surface of said base having a pair of spaced apart transverse grooves extending from said first longitudinal side;
   b) each said groove having a plurality of forwardly angled holes therealong;
   c) said rear jaw having a pair of spaced apart curved arms, with each said arm having a straight portion sized for fitting into one of said grooves; and,
   d) each said straight portion having a plurality of forwardly angled fingers therealong to adjustably snap fit into said forwardly angled holes in said matching groove.

10. The traction device according to claim 1, wherein said means for adjusting in a retained normal manner includes:
    a) said base having three spaced apart transverse apertures extending from said second longitudinal side;
    b) a second middle aperture of said three spaced apart transverse apertures having a plurality of spaced apart transverse side slots;
    c) a pair of guide pins extending from said front jaw into first and third apertures of said three spaced apart transverse apertures in said base in an adjustable manner;
    d) a shaft extending through said front jaw and into said second middle aperture in an adjustable manner; and,
    e) a plurality of spaced apart stub posts on said shaft so that when said shaft is rotated 90°, said stub posts being capable of entering and engaging said transverse side slots for locking said shaft into position.

11. The traction device according to claim 10, wherein said means for adjusting in a retained fine manner includes:
    a) a pivot cam rotatively connected off center to an outer distal end of said shaft; and,
    b) a lever connected to said pivot cam so that when said lever is rotated against said front jaw, said pivot cam will gently press against said front jaw for allowing said front jaw to apply a pre-determined amount of pressure against the front side wall of the tire for retaining said base in place and for preventing said side wall of said tire from being dislodged from said driven wheel.

12. The traction device according to claim 1, wherein said front jaw includes a pair of spaced apart lugs extending from an outer surface between said lever when said lever is rotated against said front jaw, so that a shackle of a padlock is engageable with said lugs for locking said lever in place against said front jaw.

13. A traction device for a tire on a driven wheel of a motor vehicle, comprising:
    a) a base adapted for resting circumferentially upon a tread of a tire;
    b) means for securing said base to said tire, said means for securing including an adjustable clamp assembly extending from first and second longitudinal sides of said base for holding onto side walls of said tire for applying pressure against both sides of said tire for securing said traction device to said tire, said adjustable clamp assembly including a rear jaw, a front jaw, means on a longitudinal side of said base for adjusting in a retained manner said rear jaw or said front jaw so that said rear jaw and said front jaw will butt up against opposite side walls of said tire, said means for adjusting in a retained manner including:
    1) said base having three spaced apart transverse apertures extending from said second longitudinal side;

2) a second middle aperture of said three spaced apart transverse apertures having a plurality of spaced apart transverse side slots;

3) a pair of guide pins extending from said front jaw into first and third apertures of said three spaced apart transverse apertures in said base in an adjustable manner;

4) a shaft extending through said front jaw and into said second middle aperture in an adjustable manner; and, 5) a plurality of spaced apart stub posts on said shaft so that when said shaft is rotated 90°, said stub posts being capable of entering and engaging said transverse side slots for locking said shaft into position; and, c) means for providing traction for said tire when said tire is stuck on ice, snow or other slippery road surface, said means for providing traction located on said base.

14. The traction device according to claim 13, wherein said means for adjusting in a retained manner includes:

a) a pivot cam rotatively connected off center to an outer distal end of said shaft; and, b) a lever connected to said pivot cam so that when said lever is rotated against said front jaw, said pivot cam will gently press against said front jaw for allowing said front jaw to apply a pre-determined amount of pressure against the front side wall of the tire for retaining said base in place and for preventing said side wall of said tire from being dislodged from said driven wheel.

15. The traction device according to claim 13, wherein said base includes a slightly curved inner concave surface to best fit up against a tread of the tire.

16. The traction device according to claim 15, wherein said slightly curved inner concave surface of said base is serrated for better gripping and for preventing slippage of said base on the tread of said tire.

17. The traction device according to claim 13, wherein said base includes a curved convex outer surface to best conform to the tread of the tire.

18. The traction device according to claim 13, further comprising a plurality of studs extending away from said greater curved convex outer surface of said base.

19. The traction device according to claim 13, wherein said rear jaw comprises an inner concave surface for conforming to a rear side wall of said tire.

20. The traction device according to claim 19, wherein said inner concave surface of said rear jaw is serrated for better gripping and preventing slippage on the rear side wall of the tire.

21. The traction device according to claim 13, wherein said front jaw comprises an inner concave surface for conforming to a front side wall of said tire.

* * * * *